(12) United States Patent
Lotz et al.

(10) Patent No.: US 6,627,106 B1
(45) Date of Patent: Sep. 30, 2003

(54) SALT MIXTURES FOR STORING THERMAL ENERGY IN THE FORM OF HEAT OF PHASE TRANSFORMATION

(75) Inventors: Natascha Lotz, Erzhausen (DE); Mark Neuschütz, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 268 days.

(21) Appl. No.: 09/663,686

(22) Filed: Sep. 19, 2000

(30) Foreign Application Priority Data

Sep. 25, 1999 (DE) .......................................... 199 46 065

(51) Int. Cl.$^7$ ................................................. C09K 5/00
(52) U.S. Cl. ............................. 252/67; 252/69; 252/70; 252/71; 126/910
(58) Field of Search ............................... 252/70, 71, 67, 252/69; 126/910

(56) References Cited

U.S. PATENT DOCUMENTS

| | | | |
|---|---|---|---|
| 5,728,316 A | 3/1998 | Kniep et al. | 252/70 |
| 5,785,884 A | 7/1998 | Hammond | 252/70 |
| 6,083,418 A | * 7/2000 | Czarnecki et al. | 252/70 |

* cited by examiner

Primary Examiner—Yogendra N. Gupta
Assistant Examiner—D G Hamlin
(74) Attorney, Agent, or Firm—Millen, White, Zelano, Branigan, P.C.

(57) ABSTRACT

Thermal energy in the form of heat of phase transformation can be stored in a ternary salt mixture of the formula: $ANO_3 + LiNO_3 + Mg(NO_3)_2 \cdot 6H_2O$.

19 Claims, No Drawings

SALT MIXTURES FOR STORING THERMAL ENERGY IN THE FORM OF HEAT OF PHASE TRANSFORMATION

The invention relates to salt mixtures for storing thermal energy in the form of heat of phase transformation and to the use thereof.

In technical processes it is a frequent necessity to avoid thermal peaks or deficits. To do so it is common to use heat exchangers. These contain heat transfer media which transport the heat from one location or medium to another. In order to dissipate thermal peaks, for example, the emission of the heat via a heat exchanger to the air is utilized. This heat, however, is then no longer available to compensate the thermal deficits. This problem is solved by the use of heat storage systems.

Examples of suitable storage media are water or stones/concrete, in order to store perceptible ("sensible") heat, or phase change materials (PCMs) such as salts, salt hydrates or mixtures thereof, in order to store heat in the form of heat of fusion ("latent" heat).

It is known that the melting of a substance, i.e., its transition from the solid to the liquid phase, involves consumption, i.e., absorption, of heat which for as long as the liquid state persists, is stored in latent form, and that this latent heat is released again on solidification, i.e., on transition from the liquid to the solid phase.

A fundamental requirement for the charging of a heat storage system is a higher temperature than can be obtained in the course of discharge, since heat transport/flux necessitates a temperature difference. The quality of the heat is dependent on the temperature at which it is available: the higher the temperature, the more diverse the uses to which the heat may be put. For this reason, it is desirable for the temperature level in the course of storage to fall as little as possible.

In the case of sensible heat storage (e.g., by heating of water) the input of heat is associated with gradual heating of the storage material (and vice versa during discharge), whereas latent heat is stored and discharged at the melting temperature of the PCM. Latent heat storage therefore has the advantage over sensible heat storage that the temperature loss is limited to the loss during heat transport from and to the storage system.

In order to be able to optimize latent heat stores for the respective utility, it is necessary to have available storage materials which not only have the correct melting temperature but also meet numerous other criteria. These criteria include maximum enthalpy of fusion and heat capacity, low vapor pressure, chemical and physical stability, low corrosiveness, reproducible phase transition, congruent melting behavior, little subcooling, little volume change, high heat conductivity, toxicological acceptability, recyclability, and a low price (J. Schröder, Energy Research, 1981, 103–109). For this reason, only a very few technically utilizable storage materials are known. For the majority of temperatures, no suitable materials are yet available.

Storage media for precisely defined temperatures are offered with specific salt mixtures.

U.S. Pat. No. 5,728,316 uses salt mixtures based on magnesium nitrate and lithium nitrate to store and utilize thermal energy, these mixtures, with a melting temperature of 75.6° C., being ideally suited to use in latent heat storage systems for use in motor vehicles.

Within the automotive industry, engines are undergoing continual further development. In addition to reductions in fuel consumption and in the emission of pollutants, the operating temperatures of the engines are being optimized further.

It is an object of the present invention, therefore, to provide storage media for different temperatures, having improved properties.

Upon further study of the specification and appended claims, further objects and advantages of this invention will become apparent to those skilled in the art.

These objects of the invention are achieved by means of ternary salt mixtures of the general composition $$ANO_3 + LiNO_3 + Mg(NO_3)_2 \cdot 6H_2O \qquad (I)$$

where

A is K or Na for the purpose of storing thermal energy in the form of heat of phase transformation, and the use thereof in latent heat storage systems.

It has been found that salt mixtures comprising lithium nitrate, sodium nitrate and magnesium nitrate hexahydrate in a defined ratio are effective storage media for temperatures of 65° C. to 69° C., in particular 66° C. to 68° C. At a composition of 8–14% by mass, in particular at 10–12% by mass, $LiNO_3$, 4–10% by mass, in particular 6–8% by mass, $NaNO_3$ and 78–86% by mass, in particular 80–84% by mass, $Mg(NO_3)_2 \cdot 6H_2O$, the salt mixture has a melting point of approximately 67° C.

It has surprisingly been found that a composition of 11% by mass $LiNO_3$, 7% by mass $NaNO_3$ and 82% by mass $Mg(NO_3)_2 \cdot 6H_2O$ is an ideal storage medium for temperatures around 67° C., with a high enthalpy of fusion.

It has been found that salt mixtures comprising lithium nitrate, potassium nitrate and magnesium nitrate hexahydrate in a defined ratio are an effective storage medium for temperatures of 50° C. to 54° C., in particular 51° C. to 53° C. With a composition of 11–18% by mass, in particular 13–16% by mass, $LiNO_3$, 17–23% by mass, in particular 19–21% by mass, $KNO_3$ and 61–70% by mass, in particular 63–68% by mass, $Mg(NO_3)_2 \cdot 6H_2O$, the salt mixture has a melting point of approximately 52° C.

It has surprisingly been found that a composition of 14.9% by mass $LiNO_3$, 20.3% by mass $KNO_3$ and 64.8% by mass $Mg(NO_3)_2 \cdot 6H_2O$ is an ideal storage medium for temperatures around 52° C., having a high enthalpy of fusion.

In order to improve the crystallization properties, nucleators, such as magnesium sulfate, magnesium oxide or magnesium hydroxide, for example, may be added to the salt mixtures in amounts of about 0.5 to 2% by mass.

The preferred mixtures in accordance with the invention comprise either sodium nitrate or potassium nitrate. The invention also, however, embraces those mixtures which include both potassium nitrate and sodium nitrate.

The salt mixtures can be prepared in accordance with known procedures such as described in U.S. Pat. No. 5,728,316 and U.S. Pat. No. 5,785,884.

The high enthalpies of fusion mean that, for example, for a given amount of salt, a larger quantity of heat is absorbed or, respectively, made reavailable at the phase transition point using the salt mixtures of the invention. For a given quantify of heat required, in turn, a smaller amount of salt mixture is required, so that corresponding heat storage systems may be constructed smaller and lighter.

The salt mixtures of the invention may be used to store the heat given off by motor vehicle engines. The heat emitted during operation may be stored in latent form using the storage materials. When the engine is next started, the stored energy may be utilized to heat the interior of the motor vehicle or to warm the engine.

Likewise, these salt mixtures may be utilized in latent heat storage systems for heating utility water or for heating systems.

The invention therefore provides heat storage systems comprising compounds of the formula (I).

The entire disclosure of all applications, patents and publications, cited above and below, and of corresponding German application No. 199 46 065.5 filed Sept. 25, 1999, is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A ternary salt composition according to formula (I)

$$ANO_3 + LiNO_3 + Mg(NO_3)_2 \cdot 6H_2O \qquad (I)$$

wherein

A is K or Na.

2. A ternary salt composition according to claim 1, wherein A is sodium and said composition contains 8–14% by mass lithium nitrate, 4–10% by mass sodium nitrate, and 78–86% by mass magnesium nitrate hexahydrate.

3. A ternary salt composition according to claim 1, wherein A is potassium and said composition contains 11–18% by mass lithium nitrate, 17–23% by mass potassium nitrate, and 61–70% by mass magnesium nitrate hexahydrate.

4. A ternary salt composition according to claim 1, wherein A is sodium and said composition contains 10–12% by mass lithium nitrate, 6–8% by mass sodium nitrate and 80–84% by mass magnesium nitrate hexahydrate.

5. A ternary salt composition according to claim 1, wherein A is potassium and said composition contains 13–16% by mass lithium nitrate, 19–21% by mass potassium nitrate and 63–68% by mass magnesium nitrate hexahydrate.

6. A ternary salt composition according to claim 1, further comprising one or more nucleators.

7. A ternary salt composition according to claim 6, wherein said nucleators are magnesium sulfate, magnesium oxide, magnesium hydroxide, or mixtures thereof.

8. A ternary salt composition according to claim 6, wherein said nucleators are present in an amount of 0.5–2% by mass.

9. A ternary salt composition according to claim 7, wherein said nucleators are present in an amount of 0.5–2% by mass.

10. A ternary salt composition according to claim 1, wherein said composition contains potassium nitrate and sodium nitrate.

11. In a method of storing thermal energy in a material in the form of heat of phase transformation, the improvement wherein said material is a ternary salt composition according to claim 1.

12. In a latent heat storage system comprising a phase change material for storing thermal energy, the improvement wherein said phase change material is a ternary salt composition according to claim 1.

13. In a latent heat storage system for storing heat generated by a motor vehicle engine, wherein said latent heat storage system contains a phase change material, the improvement wherein said phase change material is a ternary salt composition according to claim 1.

14. In a method of heating utility water using a latent heat storage system, the improvement wherein said heat storage system contains a phase change material which is a ternary salt composition according to claim 1.

15. A ternary salt composition according to claim 4, wherein A is sodium and said composition contains 11% by mass lithium nitrate, 7% by mass sodium nitrate, and 82% by mass magnesium nitrate hexahydrate.

16. A ternary salt composition according to claim 5, wherein A is potassium and said composition contains 14.9% by mass lithium nitrate, 20.3% by mass potassium nitrate, and 64.8% by mass magnesium nitrate hexahydrate.

17. A ternary salt composition according to claim 1, wherein A is potassium.

18. A ternary salt composition according to claim 1, wherein A is sodium.

19. A ternary salt composition according to claim 1, wherein said composition contains both potassium nitrate and sodium nitrate.

* * * * *